Figure 2:
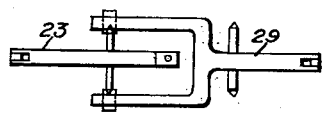

June 10, 1924.

C. A. BODDIE 1,497,402

VOLTAGE REGULATOR SYSTEM

Filed Jan. 8, 1919

WITNESSES:
J. A. Helsel
W. B. Wells.

INVENTOR
Clarence A. Boddie.

BY
Chesley G. Carr
ATTORNEY

Patented June 10, 1924.

1,497,402

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

VOLTAGE-REGULATOR SYSTEM.

Application filed January 8, 1919. Serial No. 270,112.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Voltage-Regulator Systems, of which the following is a specification.

My invention relates to voltage-regulator systems and particularly to anti-hunting means for stabilizing the operation of regulator systems.

One object of my invention is to provide a regulator system of the above-indicated character that shall be provided with double means for producing forces of different magnitude to prevent so-called "hunting" action by the regulator and shall be joined to a supply circuit in such manner that a failure of the regulator will in no way throw the supply circuit out of service.

In many supply circuits which are provided with automatic voltage regulators, and, especially if the regulators are of the vibratory type, failure of the regulators, from any cause, generally produces a breakdown of the supply circuits controlled by the regulators.

It is a very desirable feature, in supply systems, to parallel the exciter generators, which are connected to the main generators, by a storage battery so that a failure of the exciter generators will not cause a breakdown of the supply circuit. However, it is practically impossible to satisfactorily utilize a regulator of the vibratory type in connection with a supply circuit that is safeguarded by a storage battery.

It has been proposed to utilize a regulator of the automatic rheostat type for governing the supply-circuit voltage in order that the supply circuit may be safe-guarded by a storage battery and be protected from a breakdown in case of failure of the regulator. However, some trouble is experienced in using this type of regulator by reason of the pronounced tendency for such regulators to "hunt."

In a supply circuit provided with a regulator system constructed in accordance with my invention, a regulator of the automatic rheostat type is provided with double means that shall operate in a manner to insure the regulator against "hunting" action.

More specifically, my invention embodies a regulator having a control magnet that is connected in series with an adjustable resistor across the supply circuit which is to be regulated, a plurality of contact members, which are operated by the control magnet, and a second electromagnet that is connected, in series with a rheostat, across the supply circuit for opposing the action of the control magnet at predetermined times to prevent "hunting" action by the regulator. The contact members selectively control the direction of rotation of a motor that governs the rheostat in the circuit of the second magnet for controlling its operation, and a second rheostat that counteracts any change in the supply-circuit voltage. The second rheostat controls the excitation of the generator which is connected to the supply circuit. Moreover, the contact members control the operation of the resistor included in the circuit of the control magnet in a manner to oppose the initial operation of the main magnet to also prevent "hunting" action by the regulator.

Figure 1:
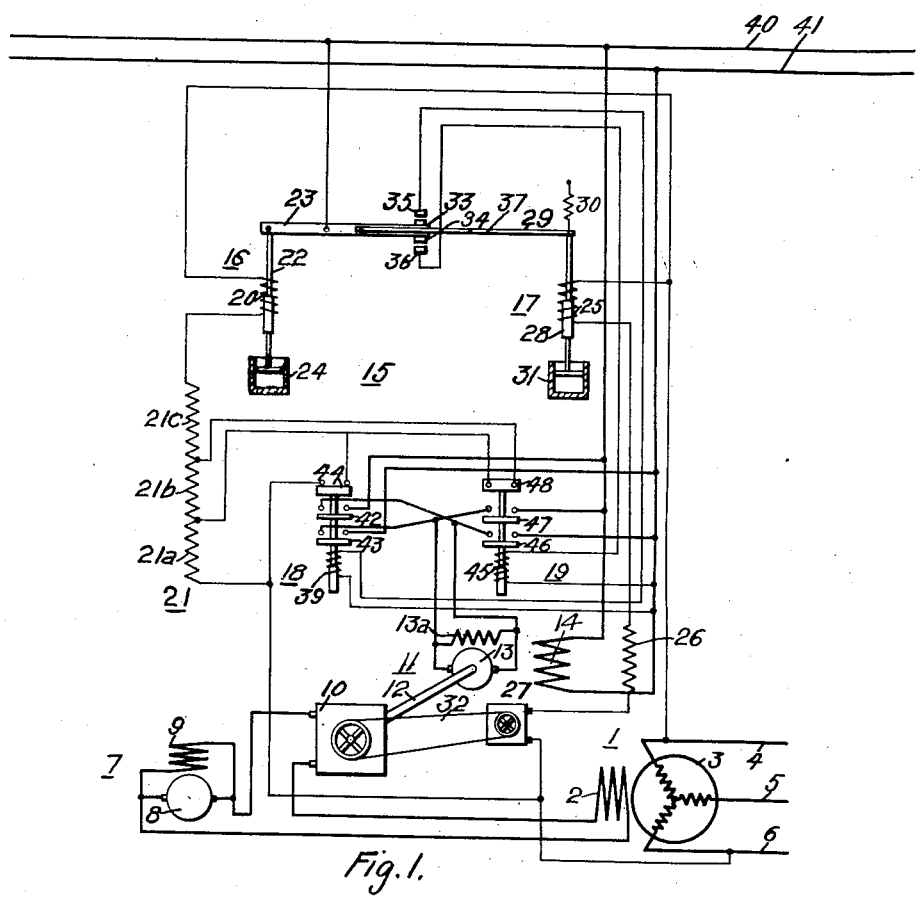

In the accompanying drawings, Figure 1 is a diagrammatic view of a system constructed in accordance with my invention, and Fig. 2 is a top plan view of a portion of the apparatus which controls the main contacts of the regulator.

Referring to the drawing, a generator 1, embodying a rotor 3 and a field winding 2, is connected to a supply circuit comprising conductors 4, 5 and 6.

The field winding 2 of the generator is connected to an exciting generator 7 comprising an armature 8 and a field winding 9 and is automatically regulated by means of a rheostat 10 which is included in the excitation circuit. The rheostat 10 is mechanically connected to a motor 11 in any suitable manner, such as by means of a shaft 12. A resistor 13a is connected across the armature 13 for dynamic-braking purposes. The motor 11, which embodies an armature 13 and a field winding 14, is adapted to be rotated, either in a counter-clockwise or in a clockwise direction, by means of a regulator 15 in accordance with the voltage obtaining on the supply circuit comprising the conductors 4, 5 and 6.

The regulator 15 comprises a control electromagnet 16, which is operated in accordance with the voltage obtaining on the supply circuit, a second electromagnet 17, and two switches 18 and 19 which are controlled by the control magnet 16 for determining the direction of rotation of the rotor 11.

The control electromagnet 16 embodies a winding 20, which is connected, through a resistor 21 embodying sections 21a, 21b and 21c, across the supply conductors 4 and 6, and a core armature 22, which is pivotally connected to a contact arm 23. The speed of operation of the magnet 16 is adjusted by means of a dash pot 24, which is directly connected to the core armature 22. The second eletromagnet 17 embodies a winding 25, which is connected, through a resistor 26 and a rheostat 27, across the supply conductors 4 and 6, and a core armature 28, which is pivotally connected to a contact arm 29 and is counter-balanced by means of the spring 30. The speed of operation of the second magnet 17 may be controlled by means of a dash pot 31. The rheostat 27, which is included in the energizing circuit of the second magnet, is operated by the motor 11 and is connected thereto in any suitable manner, such as by means of a flexible connection 32 and the armature shaft 12.

The contact arm 23, which is controlled by the control magnet 16, is pivotally mounted on the bifurcated end portion of the contact arm 29 and is provided with two contact members 33 and 34 which are adapted to respectively engage, the stationary contact members 35 and 36, according to the operative position of the control electromagnet. The contact arm 29 is pivotally mounted at a point 37 and is adapted to oppose the action of the control magnet 16 on the contact arm 23 at predetermined times under the influence of the second electromagnet 17.

The switch 18 embodies a winding 39, which is connected across an auxiliary supply circuit comprising conductors 40 and 41 by engagement of the contact members 33 and 35, two switch members 42 and 43, which connect the motor 11 across the supply conductors 40 and 41 for effecting rotation in a counter-clockwise direction, and an interlock switch 44 which serves to short-circuit the portion 21a of the resistor 21 when the switch 18 is in an operative position.

The switch 19 embodies a winding 45, which is connected across the supply conductors 40 and 41 by means of engagement of the contact members 34 and 36, two switch members 46 and 47, which connect the motor 11 across the supply conductors 40 and 41 in a manner to effect rotation thereof in a clockwise direction, and an interlock switch 48 which normally short-circuits the resistor section 21b but which is adapted to open this short-circuit when the switch 19 is in an operative position.

Assuming the voltage on the supply circuit, comprising conductors 4, 5 and 6, to be increased above normal value, then the control electromagnet 16, which is connected across the supply conductors 4 and 6, is operated in a manner to effect engagement of the contact members 34 and 36. Simultaneously, the second magnet is operated to lower the bifurcated end portion of the arm 29 in the same direction as the arm 23. Upon engagement of the contact members 34 and 36, a circuit is completed through the winding 45 of the switch 19 for operating the switch 19 to effect rotation of the motor 11 in a clockwise direction. Thereupon, the rheostat 10, which is included in the circuit of the exciter generator 7, is operated in a manner to reduce the excitation of the generator 1 and, accordingly, reduce the voltage of the supply circuit.

However, before the voltage of the supply circuit is reduced to normal value, the resistor section 21b is inserted in the circuit of the control magnet 16 by means of the opening of the interlock switch 48, and the rheostat 27, which is included in the circuit of the auxiliary magnet 17, is operated in a manner to also decrease the excitation of the second magnet 17. The inserting of the resistance 21b in the circuit of the magnet 16 will instantaneously cause that magnet to function in a manner to effect separation of the main contact members 34 and 36, thus releasing the switch 19 to prevent further operation of the motor 11 and the rheostat 10 and, consequently, to prevent further change in the supply-circuit voltage. In this case, there will be no hunting action for the reason that the magnet 16 has operated to de-energize the switch a sufficient time prior to the obtaining of normal supply-circuit voltage to permit the inertia of the moving parts of the regulator to complete such correction. Should the voltage correction needed be small, and such correction is accomplished, there will be no further operation of the regulator.

On the other hand, should the increase in voltage be large, in the above operation the motor 11 will not have moved the rheostat 10 sufficiently to correct the supply-circuit voltage, with the result that the switch 19 will again be operated to cause the motor 11 to move the rheostat 10 to further correct the supply-circuit voltage. The successive energization and de-energization of the switch 19 will be continued until the supply-circuit voltage has reached its normal value.

It will be noted that, simultaneously with the corrective movements of the rheostat 10, the rheostat 27 in the circuit of the second magnet 17, has been moved to change the setting of this magnet by intermittently decreasing the energization thereof. The effect of this change in setting is to change the location of the bifurcated end of lever 29 carrying the pivot for the contact-member-carrying arm 23. Thus, while the supply-circuit voltage is above normal value, the pivot for the arm 23 is held in proximity to the contact member 36, but, as the supply-circuit voltage approaches normal value, the pivot is moved step by step progressively nearer its normal central position, with the result that, by the time the supply-circuit voltage has returned to normal value, the arms 23 and 29 are in their normal positions of rest, and the regulator has functioned without hunting action.

In the event of the need of an exceptionally large voltage correction, the insertion of the resistance 21b may not be sufficient to affect the setting of the relay 16 to an extent to cause the contact members 34 and 36 to function in the vibratory manner just described. Accordingly, the motor 11 will have a continuous operation, and the rheostats 10 and 27 will function continuously until such time as the magnet 16 responds to the setting with the resistance 21b in circuit. From that time forward, the regulator will function in the vibratory manner just described in the preceding paragraph. Thus, there is provided a regulator which will have either a continuous operation or a vibratory operation or a combination of the two in effecting the desired voltage correction, from which is eliminated hunting action by reason of the fact that the magnets controlling the contact means of the regulator are supplied with relatively and individually differing energizing forces.

Summarized, in the above operation it will be noted that overtravel or hunting action by the regulator is controlled by a plurality of means, which respectively operate on the control magnet 16 and the second magnet 17. The resistor 21 is varied in a manner to cause one of the magnets to have a vibratory control of the contact means, and the rheostat 27 is varied in a manner to operate the other magnet in an intermittent manner.

In case the supply-circuit voltage is reduced below normal value, the control magnet 16 is operated in a manner to effect engagement between the contact members 33 and 35. Upon engagement of the contact members 33 and 35, the switch 18 is operated to effect rotation of the motor 11 in a counter-clockwise direction. Thereupon, the rheostat 10 is operated in a manner to increase the excitation of the generator 1 and, consequently, to increase the voltage of the supply circuit comprising conductors 4, 5 and 6.

However, before the voltage of the supply circuit is increased to normal value, the interlock switch 44 is operated to short-circuit the resistor section 21a and effect a consequent increase in the excitation of the main control magnet 16. Moreover, the rheostat 27 is operated by the motor 11 in a manner to also increase the excitation of the second magnet 17. The increase in the excitation of the magnets 16 and 17 effects a separation of the contact members 35 and 33 to release the switch 18 and prevent further operation of the motor 11 and the rheostat 10. The various operating methods described above in connection with correction for an increase in voltage will be effected in the manner there described except, of course, in inverse relation, to correct for the decrease in supply-circuit voltage.

From the above description, it will be noted that, in a system constructed in accordance with my invention, the hunting action of the regulator is opposed by two means, namely, the second electromagnet 17, which is controlled by the rheostat 27, and the variable resistor 21, which is operated in a manner to oppose the initial operation of the main control magnet. The two above mentioned forces, which oppose the initial operation of the control magnet, serve to effect a differential operation of the regulator.

Modifications in the system and in the arrangement and location of parts may be made within the spirit and scope of my invention, and such modifications are intended to be covered by the appended claims.

I claim as my invention:

1. In a regulator, a control magnet, a plurality of contact members operated by said magnet, switching means controlled by said contact members, and a plurality of restoring means controlled by said switching means for opposing the action of the control magnet to prevent hunting action by the regulator, one of said restoring means being a power-operated rheostat.

2. In a regulator, a control magnet, a plurality of contact members operated by said magnet, switching means controlled by said contact members, and means controlled by said switching means and producing two restoring forces of different values for opposing the initial operation of the control magnet to prevent hunting action by the regulator, one of said restoring means being a power-operated rheostat.

3. In a regulator for a supply circuit, the combination with means comprising an electromagnet and a second electromagnet for governing the voltage of the supply circuit, and resistors respectively in circuit with said magnets, of means for controlling said resistors to prevent hunting action by the regulator.

4. The combination with a supply circuit and a regulator comprising a control electromagnet and a second electromagnet for controlling the supply-circuit voltage, of a rheostat in the circuit of the second magnet, an adjustable resistor in the circuit of the control electromagnet, and means for controlling said resistor and said rheostat to prevent hunting action by the regulator.

5. The combination with a supply circuit, and a regulator comprising two co-operating electromagnets for maintaining the voltage of the supply circuit substantially constant, of means severally operating on said electromagnets for preventing hunting action by the regulator.

6. In a voltage regulator for a supply circuit, a control electromagnet operated in accordance with the supply-circuit voltage, a second electromagnet connected across the supply circuit, a plurality of contact members governed by said electromagnets, and means controlled by said contact members for severally operating on said magnets to prevent hunting action by the regulator.

7. The combination with a supply circuit, a generator connected to the supply circuit, and an exciter therefor, of a regulator comprising a control magnet for controlling the excitation of said generator, and two restoring means associated with said magnet and adapted to oppose the initial operation thereof to prevent hunting action by the regulator, one of said restoring means being a power-operated rheostat.

8. In a regulator for a supply circuit, a control magnet operated in accordance with the supply-circuit voltage, a plurality of contact members operated by the control magnet, a second magnet controlled by said contact members for opposing the initial operation of the control magnet, and auxiliary means also controlled by the contact members for varying the energizing circuit of the control magnet to oppose the initial operation thereof.

9. In a regulator, a control magnet, a plurality of contact members operated by said magnet, a second magnet controlled by the contact members for opposing the action of the control magnet at predetermined times, a resistor in the energizing circuit of said control magnet, and means also controlled by the contact members for varying said resistor to prevent hunting action by the regulator.

10. In a regulator system, a control electromagnet having a variable resistor in the circuit thereof, a plurality of contact members controlled by said electromagnet, and means controlled by said contact members and comprising a second magnet and said resistor for opposing the operation of said magnet at predetermined times.

11. In a regulator system for a supply circuit, a control electromagnet, a plurality of contact members operated by said magnet in accordance with the voltage obtaining on the supply circuit, a second electromagnet connected across the supply circuit, a resistor in the circuit of each of said electromagnets, and means controlled by said contact members for varying said resistors at predetermined times to prevent hunting action by the regulator.

12. In a regulator system for a supply circuit, a plurality of electromagnets operated in accordance with the voltage obtaining on the supply circuit, a plurality of contact members operated by said electromagnets, means controlled by said contact members for operating one of said magnets in a manner to oppose the action of the other of said magnets at predetermined times, a resistor included in the circuit of one of said electromagnets, and means controlled by the contact members for varying said resistor.

13. In a regulator system for a supply circuit, the combination with a generator, a control electromagnet, an adjustable resistor in circuit therewith, a second electromagnet, a plurality of contact members governed by said electromagnets, means comprising a motor and a rheostat connected thereto for governing the excitation of said generator, and means governed by the contact members for controlling the operation of the motor, of a rheostat in the circuit of the second magnet and also controlled by said motor, and means governed by the main contact members for controlling said resistor to prevent hunting action by the regulator.

14. In a regulator system, the combination with a supply circuit, a main generator connected to the supply circuit, an exciting generator connected to said main generator, a rheostat inserted in the exciting circuit of said generator, and a motor for operating said rheostat, of a regulator comprising an electromagnet and a second electromagnet for governing the operation of said motor to maintain a substantially constant supply-circuit voltage, and an auxiliary rheostat in the circuit of said second magnet and also operated by said motor for controlling said second magnet to prevent hunting action by the regulator.

15. The combination with a supply circuit, a generator connected to the supply circuit, an exciter system connected to said generator, and a rheostat inserted in the exciter system for governing the excitation of the generator, of a regulator for governing the operation of said rheostat to maintain the voltage on the supply circuit substantially constant, said regulator comprising a control magnet having a variable resistor in circuit therewith and operated in accordance with the supply-circuit voltage, a second electromagnet having a variable resistor in circuit therewith, a plurality of contact members operated by the control magnet, and means operated by said contact members for varying said resistors at different rates.

16. In a voltage regulator for a supply circuit, a control electromagnet operated in accordance with the supply-circuit voltage, a second electromagnet connected across the supply circuit, and means comprising a rheostat in circuit with one of said electromagnets and a resistor in circuit with the other of said electromagnets for automatically varying the energization of said electromagnets to prevent hunting action by the regulator.

17. In a regulator, a control electromagnet, an adjustable resistor in circuit therewith, contact means controlled by said electromagnet, a second electromagnet, a rheostat in the energizing circuit thereof, and means governed by said contact means for selectively controlling said resistor and said rheostat to prevent hunting action by the regulator.

18. In a regulator system for a supply circuit, a generator, a control electromagnet, a second electromagnet, a plurality of contact members governed by said electromagnets, means comprising a motor and a rheostat connected thereto for governing the excitation of said generator, means governed by the said contact members for controlling said operation of the motor, and a second rheostat also controlled by the motor for governing said operation of the second electromagnet.

19. In a regulator, a control electromagnet, an adjustable resistor in circuit therewith, a plurality of contact members controlled by said electromagnet, a second electromagnet, a rheostat in the energizing circuit thereof, and means governed by said contact members for selectively controlling said resistor and said rheostat whereby said regulator will have either a vibratory corrective operation or a continuous corrective operation or a combination of the two operations.

20. In a regulator, a control electromagnet, a sectional resistor in circuit therewith, switches respectively controlling shunt circuits for the sections of said resistor, a second electromagnet, a rheostat in the energizing circuit thereof, and contact means controlled by said electromagnets, said contact means selectively controlling said resistor and said rheostat whereby said regulator will have a vibratory corrective operation or a continuous corrective operation or a combination of the two operations.

21. In a regulator, a control electromagnet, a second electromanet, a plurality of contact members controlled by said electromagnets, and means controlled by said contact members for selectively energizing said electromagnets with forces of different magnitudes whereby said regulator will have a vibratory corrective operation or a continuous corrective operation or a combination of the two operations, free from hunting action.

22. In a regulator, a control electromagnet, a variable resistor in circuit therewith, a second electromagnet, a variable resistor in circuit therewith, a plurality of contact members controlled by said electromagnets, and means governed by said contact members for energizing said electromagnets with forces of relatively different magnitudes to prevent hunting action.

23. In a regulator, a control magnet, a second electromagnet, contact means controlled thereby, means for energizing said electromagnets, and means for varying the energization of said electromagnets through relatively different magnitudes to prevent hunting action.

24. In a regulator, a control magnet, a second electromagnet, contact means controlled thereby, and means in addition to the quantity to be regulated for varying the energization of said electromagnets through relatively different magnitudes, the energization of one of said magnets being of varying magnitude, to prevent hunting action.

25. In a regulator system for maintaining the voltage for a supply circuit substantially constant, the combination with a generator to be controlled having an exciter system connected thereto, and means for varying the excitation of said generator, of a regulator for controlling said means comprising a plurality of electromagnets, each having a resistor in circuit therewith, contact members controlled by said electromagnets, and means controlled by said contact members for varying the respective values of said resistors at different rates whereby one of said magnets will have a vibratory action in controlling said contact members and the other of said magnets will have an intermittent step-by-step adjustment in the control of said contact members.

26. In a regulator system for maintaining the voltage for a supply circuit substantially constant, the combination with a plurality of electromagnets, each having a resistor in circuit therewith, and contact members controlled by said electromagnets, of means controlled by said contact members for varying the respective values of said resistors at relatively and individually differing rates whereby one of said magnets will have a vibratory action in controlling said contact members and the other of said magnets will have an intermittent adjustment in the control of said contact members to prevent hunting action by the regulator.

27. In a regulator system, the combination with a plurality of electromagnets, each having a resistor in circuit therewith, of means for automatically varying the respective values of said resistors at different rates whereby said system will operate free from hunting action.

In testimony whereof, I have hereunto subscribed my name this 20th day of Dec., 1918.

CLARENCE A. BODDIE.